United States Patent [19]

Jochum

[11] Patent Number: 4,607,727
[45] Date of Patent: Aug. 26, 1986

[54] GREASE ZERK RAM

[76] Inventor: Vincent F. Jochum, c/o Gary Jochum, 641 S. 84th St., Lincoln, Nebr. 68510

[21] Appl. No.: 712,626

[22] Filed: Mar. 18, 1985

[51] Int. Cl.⁴ .................................................. F01M 11/00
[52] U.S. Cl. ..................................... 184/38.1; 184/105.1
[58] Field of Search ............ 184/105 R, 105 A, 105 B, 184/105 C, 38 R

[56] References Cited

U.S. PATENT DOCUMENTS

| 1,496,104 | 6/1924 | Selden | 184/105 B |
| 1,579,653 | 4/1926 | Dieringer | 184/38 R |
| 1,703,278 | 2/1929 | Claud-Mantle | 184/105 A |
| 1,932,796 | 10/1933 | McNaught | 184/105 R |
| 1,951,503 | 3/1934 | Creveling | 222/260 X |
| 2,314,374 | 3/1943 | Sundholm | 184/105 R |
| 3,447,548 | 6/1969 | Perkins | 184/38 R |

FOREIGN PATENT DOCUMENTS

| 620537 | 5/1961 | Canada | 184/105 R |
| 573360 | 6/1924 | France | 184/105 B |
| 1059011 | 11/1953 | France | 184/105 B |
| 353115 | 7/1931 | United Kingdom | 184/105 R |

*Primary Examiner*—Leonard E. Smith
*Attorney, Agent, or Firm*—Hiram A. Sturges

[57] ABSTRACT

A grease ram having an elongated body having a hole extending therethrough, a force-receiving device at a rear end of the body which can be a hammer below receiving member, a plunger attached to and extending forwardly from the force-receiving device and having portions snugly fitting in said hole to force grease forwardly therethrough, a grease insert port extending through said body, a grease insert valve in the port for filling the body with grease and retaining the grease in the body during ramming, a receiving unit attached to the forward end of the body for receiving a target grease fitting to be rammed, the receiving unit having an open forward end receiving the target grease fitting at times when the fitting is to be greased, the receiving unit being adapted to grip around the larger head of a grease fitting for holding the ram to the grease fitting, a target grease fitting protector attached to the body in an adjustable manner for holding the body during ramming such that the forward end of the protector is disposed forwardly of the forward end of the target grease fitting receiving unit for engaging those surfaces of a machine surround the target grease fitting whereby forward motion of the body and of the grease fitting protector does not damage the target fitting during ramming, the connection between the protector and the body being adjustable and preferably being a threaded connection for adjusting the position of the forward end of the protector with respect to the body.

5 Claims, 2 Drawing Figures

GREASE ZERK RAM

BACKGROUND OF THE INVENTION

This invention is in the field of grease rams and an example is U.S. Pat. No. 1,496,104, issued to A. R. Seldon, June 3, 1924, and entitled BEARING CLEANER. In this patent a ram piston having a smaller forward end and a larger rearward end was employed and the body for the ram had a port for admission of grease but had bulkiness because the grease came from a large reservoir attached to the side of the ram.

U.S. Pat. No. 1,579,653 was issed to P. R. Dieringer on Apr. 6, 1926, titled BEARING OBSTRUCTION EJECTOR. In this patent the piston had only one diameter without a smaller forward portion for multiplying power. The body had a grease insert port provided with a ball check fitting attached to it and to which a grease gun could be applied. However, the fitting was very bulky.

Dieringer intended that a hammer blow be struck to remove his piston.

U.S. Pat. No. 1,932,796 was issued to N. F. McNaught on Oct. 31, 1933, and entitled GREASE RAM.

In this patent an impact head for receiving a hammer blow was the ramming force, but the piston had only one diameter and there was no grease input fitting in the side of the body.

U.S. Pat. No. 1,951,503 was issued to J. L. Creveling Mar. 20, 1934, entitled LUBRICATION DEVICE. This device had a piston with a larger rearward portion and a smaller forward portion. Although the larger piston action could be driven with power from a screw thread on the piston, yet the forward portion was only slidable with respect thereto and at its rearward end was a handle with no concept of the application of great force, such as by a hammer blow.

U.S. Pat. No. 3,447,548 was issued to A. R. Perkins on June 3, 1969 and titled PUMP FOR CLEARING AN OIL PASSAGE. In this patent only a single piston outermost diameter was used and striking with a mallet was suggested.

However, in all of these patents above mentioned, there was none to solve the very important problem that has plagued this type of product. The problem is that when an impact force is applied to a ram, the grease fitting on a machine, commonly called a zerk, is often damaged because the force applied against it is quite great.

To my knowledge no solution has been proposed to the immense amount of damage that has occurred using grease rams without protectors for the target zerks, though the amount of damage would be much greater if grease rams had been otherwise designed effectively since if they had been more effective there would have been more attempts to use them.

A particular object of this invention is to provide a grease ram forward part which is a zerk-gripping snap-on fitting such as is used on grease guns which are already in mass production so that low-cost manufacture is possible. The zerk is firmly gripped around the back side of its larger outer portion so that the force of the ramming does not tend to cause the ram to be pushed away from the zerk by the force of the grease. None of the prior art patents have this and very little force can be applied to the body of a grease ram only manually.

An object of this invention is to provide a ram which can be filled with grease from an ordinary grease gun so that before ramming begins there is already great pressure inside the ram. Then when the impact force is applied, the pressure rises much higher, whereby grease that is stuck and clogged in the bearing can be rammed loose with surprising effectiveness.

A particular object is to provide a ram which can apply a force of great magnitude without damaging the zerk, by adjusting a protector to a desired position of protrusion from the body of the ram so as to engage the surface surrounding the target zerk so it, and not the target zerk absorbs the ramming force.

A problem comes in the undesired bending of ram-plungers.

It has been discovered that this bending happens because hammer blows are sometimes on the edge of the plunger head. A solution provided herein is to round the head of the plunger as was discovered to surprisingly help prevent this problem.

DESCRIPTION OF THE PREFERRED EMBODIMENT

Figure 1:
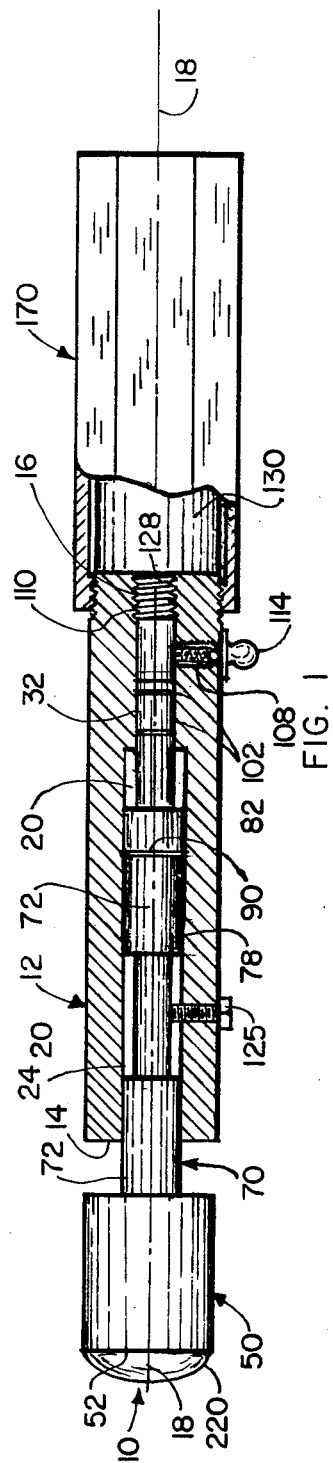
FIG. 1 is a side elevation of the ram of this invention with much of the closer half removed, a portion of the protector being broken away and the remainder shown in full lines, the target grease fitting receiving unit 140 being shown in full lines.

The grease ram of this invention is generally indicated in FIG. 1 at 10 and has a body 12 which is elongated from its rearward end 14 to its forward end 16.

The body 12 extends along an axis 18 and has a hole therethrough generally indicated at 20 extending along the axis 18.

The hole 20 has a first or rear portion 24 having a cylindrical wall symetrical about the axis 18 and has a second and forward hole portion 32 having also a cylindrical wall symetrical about the axis 18 but of lesser diameter than the rearward hole portion 20.

A ram head generally indicated at 50 has an impact surface 52 on its rearward side which is adapted to be struck by a hammer. The ram head 50 can also be described as a forward propulsion force impact or otherwise. Ram head 50 is disposed at the rearward end of the body 12.

A plunger 70 is fixed to the forward side of the force receiving ram head 50 and extends forwardly and slidably into the body 12 along the axis 18 for reciprication with respect to the body 12 along the axis 18.

The plunger 70 has a rearward portion 72 extending from the ram head 50 forwardly in the larger rearward portion 24 of the hole 20 and fitting the portion 24 snugly and slidably.

The rearward portion 72 of the plunger 70 has a recess 78 preferably extending completely around its circumference and elongated along the axis 18.

Two smaller O-ring gaskets 102 surround the smaller forward plunger portion 82.

A grease inlet port 108 extends through the body 12 between the larger diametered hole portion 24 and a threaded part of the wall of the smaller diametered hole portion 32, such part 110 being at the forward end of the hole part 110 and extending to the forward end 16 of the body 12.

The inlet port 108 threadedly receives a grease inlet valve fitting or inlet zerk 114 so that a common grease gun, not shown, can be used to shoot grease into the ram by attachment of the gun to the inlet zerk 114 after the ram is attached to a target zerk or target grease valve fitting 150 of a machine not shown having an outer surface shown only in dotted lines at 124.

Reciprocation of the plunger 70 is limited by a setscrew 125 threadedly received through the body 12 and extending into the recess 78, holding the plunger 70 in the body 12.

The forward threaded part 110 of the hole 20 receives a hollow threaded protrusion 128 of a common grease valve fitting receiving and releasable gripping assembly 130, also called a grease gun zerk snap-on 130.

The gripping assembly 130 has an internal mechanism generally indicated at 140, mass produced in the prior art and having jaws partially shown diagramatically at 131. A target zerk or target grease valve fitting is shown in dotted lines at 150 at the right in FIG. 2, pretruding from a surface or wall 152 of a device or machine not shown, having a clogged grease passage therein, not shown.

The target fitting 150 has a head 153 of a larger size in a portion 154 thereof than in a portion 156 thereof attached to a larger base 157 of the target fitting 150 which has its flat other side 158 against a surface 160 of a machine not shown on which the target fitting is mounted.

Figure 2:
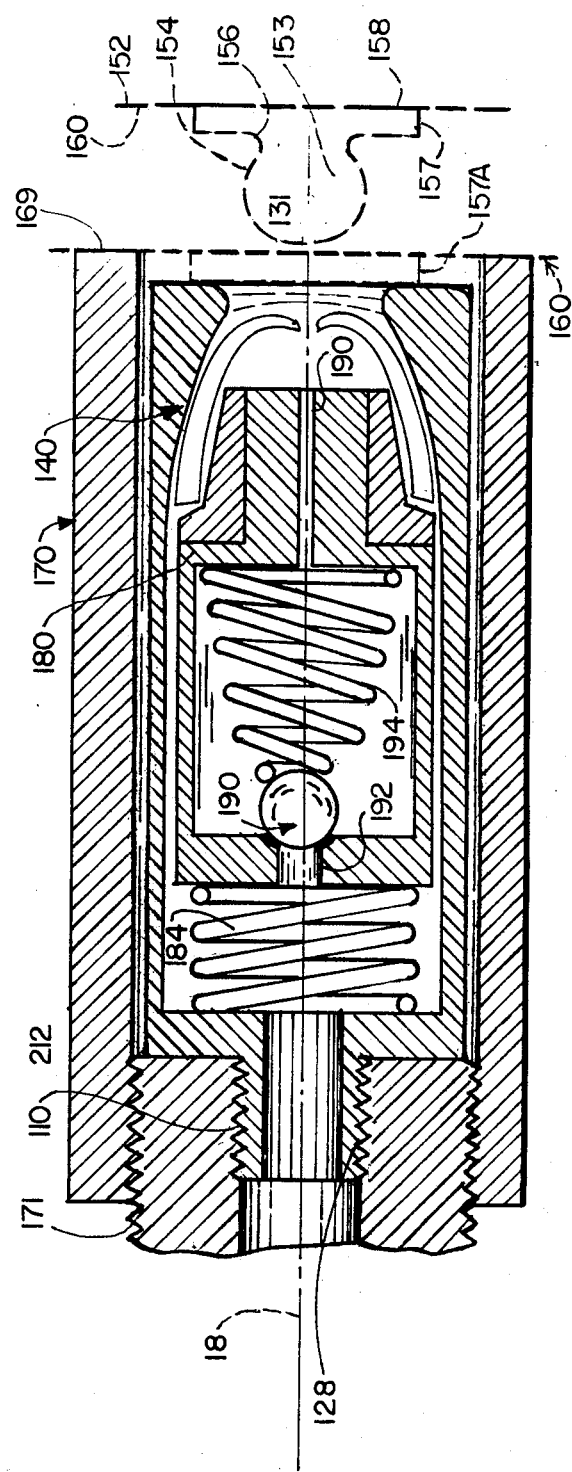
FIG. 2 is a detail showing the protector in the target grease receiving unit in cross-section together with a forward portion of the body. A target grease zerk and surface on which it is mounted is shown in dotted lines to the right. The base of the target zerk is shown in dotted lines to the left in a position relative to the ram in which it is disposed during ramming. The jaws of the receiving unit are shown only diagrammatically as such receiving units and such jaws are common in the prior art in units which are called grease gun snap-ons.

In FIG. 2 at 157 is a dotted line position of the base 157 after the head 152 has been received into a position not shown in the snap on target grease fitting gripping assembly 130, whereby the forward end 169 of the grease target fitting protector 170 will engage the surface 160 during ramming so that in those ramming times positions the target fitting 150 is protected from being forced upon by forward movement of the body 12.

The protector 170 is sleeve shaped and it receives gripping assembly 130 freely and slidably.

The protector 170 is octogonal or other polygonal shape on its outer side and symmetrical around the axis 18 so as to be easy to hand rotate.

The protector 170 is adjustably attached to an externally threaded forwardmost section 171 of the body 12. The threaded section 171 is engaged by internal threads on the sleeve shaped protector 170, sufficient to make possible the ramming positions described, the internal threads being seen at 173.

The prior art target-fitting-gripping snap-on assembly 130 accomplishes gripping because its jaw support 180 moves rearwardly compressing a spring 184 to allow its free floating jaws 131 to be pushed in as the gripping assembly 130 is pressed onto the head 152 of the target zerk grease fitting 150.

Thereafter the inwardly curved jaws 131 hook around the backside of the target grease fitting head 152 near the base 156, gripping the target fitting 150 firmly so that grease can pass through an opening in the rearward end of the outer housing 186 of the gripping assembly 130 and through a valve 190 in an opening 192 through the rearward end of the hollow jaw support 180 and out through an outlet passage 191 into the hollow target zerk 150.

The valve 190 is a check valve having a spring 194 in the hollow rearward portion of a rear portion of the jaw support 180.

The spring 184 urges the jaw support 180 and jaws 131 forwardly after the target zerk 150 has been received behind the inwardly hooking forward ends of the jaws 131, whereby the jaws 131 are forced inwardly by inclined surfaces 200 of a housing 202 surrounding the jaws 131, jaw support 180, attached to the protrusion 128, and receiving the spring 184 which presses the jaw support 180 forwardly by being between a rear wall 212 of the housing 140 and the jaw support 180.

The plunger 70 has a smaller forward portion 82 of lesser diameter than, but connected to, the forward end of the larger rearward plunger portion 72. The smaller forward plunger portion 82 reciprocates snugly in the smaller second forward portion 32 of the hole 20.

An O-ring gasket 90 surrounds the plunger 70 between the recess 78 and its smaller forward portion 82.

It is important that as the grease gun is applied to the inlet zerk 114, the grease will push the plunger backward about three-fourths of an inch until the portion 72 of the plunger engages the setscrew 125.

Although the jaws are shown only diagrammatically, it is to be understood that, in these standard prior art grease gun snap-on zerk-receiving units, the jaws thereof are adapted to grip around the zerk sufficiently for holding tightly onto the zerk. Suck standard snap-on units have three jaws 131, only two of which are diagrammatically shown, and the way the snap-on target zerk-receiving unit is removed from the zerk is to incline the body 12 at such an angle that the zerk can pop out from between two adjacent ones of the three jaws 131, the third jaw not being shown. The three jaws 131 are equidistantly spaced apart around the axis 18 and are of equal size.

The forward end of the larger plunger portion 72 is positioned so that at times when the ram head 52 has struck the rearward end of the body 12 at 14, then the forward end of the larger portion 72 of the plunger will be disposed rearwardly of the forward end of the larger portion 24 of the hole so that any stoppage force is resisted only at the rearward end of the body. For the same reason, the setscrew 125 is disposed so that the setscrew will be forward of the rearward end-wall of the recess 78 at the time the forward end of the plunger head 50 hits the rearward end 14 of the body 12.

It has been discovered that a hammer impact on the head of a plunger can cause it to bend, particularly if the rearward surface 52 of the plunger is flat, whereby there is a circular corner which is absent in the rearward end of the head hereof because the head hereof is rounded at its rearward end to eliminate such corners, as shown at 220.

I claim:

1. A grease ram comprising: a body, said body being elongated along an axis and having a hole extending therethrough along said axis, said hole having a first portion having a cylindrical wall, a force-receiving means at one end of said body, a plunger fixed to said force-receiving means and slidably extending into said body along said axis said plunger having a recess in its periphery, said recess being elongated along said axis, motion limiting means mounted on said body and protruding into said recess to limit outward movement of said plunger, piston means on said plunger inwardly of said recess and making close sliding fit with said cylindrical wall of said body, a grease insert port at one side of and extending through said body, a grease insert valve fitting in said port and normally closing said port and adapted to receive pressurized grease therethrough for the filling of said body with grease under pressure prior to ramming, the other end of said body being its forward end, a target grease fitting receiving unit attached to said forward end of said body and having an open forward end which receives therein a target grease fitting at times when said target fitting is to be greased, said unit having an open rearward end in communication with said hole, said body and said unit defining a body and unit assembly, a grease fitting protector, means attaching said protector to said body and unit assembly for holding to said assembly in a position such that the forward end of said protector is disposed forwardly of the forward end of said unit for engaging a surface of a device from which said target grease fitting protrudes whereby forward motion of said unit does not damage said target fitting.

2. The grease ram of claim 1 having said protector having a recess in its forward end for receiving said target fitting.

3. The grease ram of claim 1 having said grease fitting receiving unit capable of releasably gripping a target grease fitting so as to hold said receiving means onto a target grease fitting during ramming.

4. The grease ram of claim 1 having said means attaching said protector to said body being: body threads on said body, protector threads on said protector coaperative with said body threads whereby said protector can be caused to project forward from said body various amounts by rotating said protector with respect to said body.

5. The grease ram of claim 4 having said protector having a recess in its forward end for receiving said target fitting, said protector being annular at its forward end for surrounding a grease fitting.

* * * * *